United States Patent Office 3,398,107
Patented Aug. 20, 1968

3,398,107
MODIFIED XYLENE-FORMALDEHYDE RESINS
Charles A. Rowe, Jr., Elizabeth, Clifford W. Muessig, Roselle, and Stephen A. Yuhas, Jr., Perth Amboy, N.J., assignors to Esso Research and Engineering Company, a corporation of Delaware
No Drawing. Filed Oct. 28, 1965, Ser. No. 505,474
21 Claims. (Cl. 260—19)

ABSTRACT OF THE DISCLOSURE

Phenol-modified xylene formaldehyde resins that are highly attractive varnish composition components are formed by contacting xylene-formaldehyde resins having a molecular weight, as determined by vapor phase osmometry, between about 500 to 1,000 and oxygen contents varying from about 7 to 16 weight percent with critical amounts of a hydrocarbon substituted phenol compound in the presence of an acid catalyst.

---

The present invention relates to modified xylene-formaldehyde resins and to a method for their preparation. More particularly, the present invention is directed to phenol-modified xylene-formaldehyde resins. Still more particularly, the present invention is directed to high molecular weight, high viscosity, phenol-modified xylene-formaldehyde resins, a critical method for their formation, and their use as varnish and paints constituents.

The acid-catalyzed reaction of aromatic hydrocarbons with formaldehyde to form resin-like materials was first reported by Baeyer and his co-workers as far back as 1872. Similarly, Ching Yun Huang, reported in Kobunshi (High Polymers), vol. 10, No. 106, pp. 51–55 (1961) the formation of phenol-modified xylene-formaldehyde resins. Both xylene-formaldehyde resins and phenol-modified xylene-formaldehyde resins have been proposed for use in typical varnish compositions; however, serious difficulties have been experienced with their use. For example, xylene-formaldehyde resins are not completely suitable as varnish or paint constituents as the resin tends to degrade during cooking processes, and finishes containing the xylene-formaldehyde resins are very susceptible to weather damage. Phenol-modified xylene-formaldehyde resins have not been widely used as the resin component in varnish compositions due to the fact that with the resins used, the varnishes had excessively long drying times and were readily degraded by contact with gasoline and outdoor weathering as compared to varnish compositions containing the widely used phenolic resins.

Now, in accordance with the present invention, it has been surprisingly discovered that varnish compositions having very short drying times, hard cured surfaces, improved resistance to gasoline and to outdoor weathering can be formed by utilizing as the resin component in the varnish, a phenol-modified xylene-formaldehyde resin formed by reacting a xylene-formaldehyde resin having critical molecular weight and oxygen content ranges with specific narrowly defined amounts of hydrocarbon substituted phenol compounds in the presence of an acid catalyst. The resin formation reaction is conducted at slightly elevated temperatures and moderate pressures for a time sufficient to obtain a substantial yield of phenol-modified xylene-formaldehyde products. In addition to its use as an excellent varnish component, the resin product of the process of the present invention serves well as a component in varnish-base aluminum paints.

In general, the varnish resins formed with the process of the present invention are prepared by reacting a xylene-formaldehyde resin with a boiling point in excess of 645° F. at atmospheric pressure having a number average molecular weight, as determined by the vapor phase osmometry, between 500 and 1000, preferably from about 600 to 900 and containing from 7 to 16 wt. percent preferably from about 8 to 11 wt. percent oxygen in the form of acetal groups, ether groups, hydroxy methyl groups, and methyl ethers of hydroxy methyl groups with an ortho or para aliphatic or aryl substituted phenol in certain critical molar ratios, at moderately elevated temperatures in the presence of acidic catalyst.

Suitable ortho or para aliphatic or aryl substituted phenols useful in the preparation of the varnish resins of this invention may be represented by the following formula:

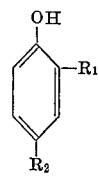

wherein $R_1$ and $R_2$ may be a hydrogen radical, an alkyl substituted or unsubstituted aryl radical, a straight or branched chain alkyl radical, a cycloalkyl radical or a straight chain, branched chain, or cyclic alkenyl radical, said alkyl, cycloalkyl, aryl and alkenyl radicals having from 3 to 10, preferably 4 to 8 carbon atoms per radical. In any given phenol compounds, the values of $R_1$ and $R_2$ may be the same or a different hydrocarbon moiety. The phenol compounds may be either ortho substituted, para substituted, or both ortho and para substituted. Preferably alkyl or alkenyl substituted phenol compounds are used.

Representative, nonlimiting examples of useful aliphatic and aryl substituted phenol compounds include: p-propyl phenol, p-tert-butyl phenol, p-octyl phenol, o-allyl phenol, p-allyl phenol, o- and p-crotylphenol, o- and p-methallyl phenol, 3-(p-hydroxyphenyl) cyclopentene-1 and 3-(o-hydroxyphenyl) cyclopentene-1, o- and p-(3-methylcrotyl) phenol, o- and p-phenyl phenol, etc.

The present reaction between xylene-formaldehyde resins having oxygen contents in the range of from 7 to 16 wt. percent, molecular weights varying from about 500 to 1000, and viscosities as expressed in standard Saybolt units at 210° F. varying from 600 to 30,000 preferably 2000 to 25,000, and aliphatic or aryl substituted phenol compounds is preferably carried out in bulk, that is, in the xylene-formaldehyde resins and phenol compound itself. While the xylene-formaldehyde resin is a very viscous liquid or a resinous solid at room temperature, at the conditions of the reaction the resin is in a liquid form and readily reacts with the phenol compound under the influence of acidic catalysts.

The catalyst used to promote the reaction of the xylene-formaldehyde resin with the phenol compound may be either a conventional mineral acid or an organic sulfonic or phosphoric acid. Conventional acidic catalysts such as aqueous solutions of concentrated sulfuric acid, perchloric acid, phosphoric acid, and hydrochloric acid, as well as the cationic types of ion exchange resins can be used. Aqueous sulfuric acid, having a concentration from 10 to 100 wt. percent, more desirably from 60 to 80 wt. percent is a particularly effective reaction catalyst. Additionally, materials such as boron trifluoride, or the adduct of boron trifluoride with phosphoric acid may be used. Particularly preferred catalysts for use in the present process are the aryl or alkyl phosphoric or sulfonic acids such as p-toluene sulfonic acid or xylene sulfonic acid. In the case of the alkyl or aromatic substituted acids, it is desirable to dissolve the acid in a minor amount of a $C_1$ to $C_4$ lower alkyl alcohol such as methanol or ethanol prior to introducing the catalyst into the reaction zone.

The amount of catalyst present in the reaction zone can vary from 0.05 to 0.6 wt. percent, preferably 0.075 to 0.2 wt. percent of catalyst based upon the weight of the xylene-formaldehyde resin in the reaction system.

The reaction for the formation of the desired resin products is carried out at a temperature in the range of from about 100 to 180° C., preferably 140 to 165° C. The pressure at which the reaction is conducted is not critical. Good results are obtained when the reaction is conducted at about atmospheric pressure although pressures can be used ranging from 1 to 10 atmospheres, preferably from 1 to 4 atmospheres. The reaction time can be varied over a wide range and generally the reaction is continued for a time sufficient to obtain a substantial product yield. Reaction times varying from 0.5 to 8 hours, preferably from 0.5 to 4 hours, are suitable to obtain appreciable yields at the conditions of pressure and temperature set forth above.

The reaction vessel can be constructed of any material that is inert to the reactants and diluents used and is capable of withstanding the operating pressures. Reaction vessels made of glass, stainless steel and glass-lined steel are satisfactory.

In a typical reaction procedure, a xylene-formaldehyde resin having a number of average molecular weight varying from about 500 to 1000, an oxygen content varying from 7 to 16 wt. percent, and a viscosity as expressed in standard Saybolt units at 210° F. between 2000 and 25,000 is introduced into a 1-liter, 4-neck, round-bottom flask fitted with a stirrer, water condenser, and thermowell.

Air is flushed from the reaction zone with nitrogen and a nitrogen or other inert gas atmosphere is maintained in the system throughout the reaction in order to minimize product discoloration and/or degradation. To the resin contained in the flask is then introduced an amount of p-tert-butyl phenol. The amount of phenol compound used in conjunction with the xylene-formaldehyde resin is a function of the weight percent of oxygen in the resin and constitutes a critical feature of the present invention. For xylene-formaldehyde resins containing from 7 to about 11 wt. percent oxygen, the molar quantity of phenol compound to 100 grams of resin should be maintained between 0.4 to 0.53. For resin compositions containing from 11 to about 13 wt. percent oxygen, the molar quantity of phenol compound to 100 grams of resin should vary between 0.53 to 0.66. For resins containing larger amounts of oxygen such as resins containing 13 to 16 wt. percent oxygen, the molar quantity of phenol compound to 100 grams of xylene-formaldehyde resin in the reaction zone should vary between about 0.66 to 0.80.

After the resin and phenol compound are introduced into the reaction vessel, air is purged with nitrogen and a Dry Ice condenser is placed on top of the water condenser. The resin and phenol compound are then heated to a temperature of about 110° C. and permitted to equilibrate during which time the total reaction mass becomes less viscous and the phenol reagent dissolves into the xylene-formaldehyde resin. To this heated reaction mixture is then added about 0.1 wt. percent of p-toluene sulfonic acid based on the weight of the xylene-formaldehyde resin usually as a 20% solution in methanol. To prevent an excessive exotherm, the acid catalyst may be added in increments. Within a few minutes after catalyst addition, a water and formaldehyde solution, formed as a reaction product begins to reflux and the temperature in the reaction zone increases slightly due to the exothermic nature of the reaction. After the reaction has commenced, the reaction zone temperature is raised to and maintained at a temperature of 125° C. for a period of about 45 minutes during which time an azeotrope trap is inserted into the system. Following the 45-minute reaction period, the temperature of the zone is raised to about 155° C. for a period of about 120 minutes in which time water is removed from the system with the azeotrope trap. Depending upon the amount of phenol and the particular xylene-formaldehyde resin used, from 80 to 90% of the theoretical amount of water is collected.

Following the reaction, the product may be treated in a number of ways. For example, the phenol-modified xylene-formaldehyde reaction product may be dissolved in cyclohexane and washed with aqueous sodium carbonate solutions to neutralize any acid remaining in the resin. The cyclohexane phase is then vacuum stripped leaving a product containing from about 95 to 99% solids. This procedure leads to opaque products which exhibit a high ash content that cannot usually be removed by filtration through paper or charcoal. A substantially clear, light yellow product whose ash content is the same as the ash content of the starting xylene-formaldehyde resin can be obtained by simply contacting the resin product while it is in the molten state at 145° to 150° C. with an amount of sodium bicarbonate sufficient to neutralize the acid catalyst remaining in the product. Alternatively the catalyst may be permitted to remain in the reaction product yielding a light yellow material.

The resin products of the present invention may contain from about 40 to 70 mol percent xylene-formaldehyde resin and from 60 to 30, preferably from 55 to 35 mol percent of the phenol compound. The molar ratio of phenol radicals to xylene radicals in the resin varies from 0.6 to 1.2. The resin products normally exhibit number average molecular weights varying from 1000 to 10,000, preferably 1500 to 6000; melting points ranging from about 80 to 150° C., preferably 100 to 130° C.; oxygen contents varying from about 3 to 8 wt. percent; and specific gravities ranging from 0.9 to 1.2, preferably 1.0 to 1.1. Additionally, the essentially ash-free resin products are generally yellow to dark amber solids that are soluble in all proportions with fatty acid oils (drying oils), toluene, xylene, methyl ethyl ketone, methyl isobutyl ketone, and ethyl acetate. The resin, however, is insoluble in ethyl alcohol, but will dissolve in higher aliphatic alcohols such as n-butanol.

As stated previously, the principal utility of the resin products of this invention resides in their use as varnish resins and as vehicle components in varnish-based aluminum and maintenance paints. The method for the formation of varnishes is a well-defined art (see Rogers' Manual of Industrial Chemistry, C. C. Furnas, Editor, sixth edition, vol. 2, D. Van Nostrand Company, Inc., pp. 999–1004). Generally, varnishes are formed by admixing a varnish resin and a fatty acid oil such as linseed oil, tung oil, soya oil, dehydrated castor oil, safflower oil, etc. at a temperature varying from about 200 to 350° C. for a time varying from 30 minutes to 3 hours. After this initial period of heating, additional resin and a reactive fatty acid oil such as tung oil may be added to the mixture and heated at slightly lower temperatures for a time sufficient to obtain the desired varnish viscosity.

When the desired viscosity is obtained, the mixture is permitted to cool at a temperature varying from about 150 to 200° C. and admixed with high boiling aliphatic and aromatic hydrocarbons. If the resulting varnish is cloudy, the total mixture is filtered to remove any particulate material contained in the varnish product. Following the filtration operation the rough varnish product is permitted to cool, and then is mixed with typical driers such as lead, cobalt, and manganese naphthenates. With the resin products of the present invention, varnishes can be secured having shorter drying times, harder cured surfaces, and improved resistance to gasoline and outdoor weathering than is normally obtained with either xylene-formaldehyde resins or prior art phenol-modified xylene-formaldehyde resins.

Alternatively, the technique of "cold-blending" may be used to prepare a varnish. In such a case the oil is prebodied to a high viscosity, and a hydrocarbon solution of the resin is dissolved at room temperature in a solution of the prebodied oil.

In order to further illustrate the practice of the invention, the following examples are provided, but it should be understood, however, that they should not be construed as limiting the same in any manner whatsoever.

EXAMPLE 1

To demonstrate the criticality of maintaining proper phenol to xylene-formaldehyde resin concentrations during the formation of the resin products of this invention, a series of tests were conducted wherein 300 grams of differing types of xylene-formaldehyde resins were reacted with varying amounts of p-tert-butylphenol. The desired varnish resins were formed by first heating the xylene-formaldehyde resin with the phenol compound to a temperature of about 110° C. To the resulting molten mixture was then added 2 cc. of an alcohol solution of p-toluene sulfonic acid that contained about 0.3 gram of acid. The total mixture was first maintained at a temperature of 125° C. for 45 minutes and then heated for two additional hours at 155° C. The product secured was then poured from the reactor, permitted to cool, and crushed.

Two hundred grams of the phenol-modified xylene-formaldehyde resin was then cooked with 466 grams of alkali refined linseed oil at 310° C. until a 50% hydrocarbon solution of the linseed oil-resin mixture exhibited a Gardner viscosity of from A-E. When the desired viscosity level was achieved, 200 grams of additional resin and 470 grams of tung oil was added to the mixture. The total mixture was maintained at a temperature of 240° C. until a 50% hydrocarbon solution of the product exhibited a Gardner viscosity of from A-E. This product was permitted to cool to 180° C. and mixed with a drier system and 1336 grams of solvent consisting of four parts of mixed aliphatic hydrocarbons and one part of xylene.

The resulting varnishes were then applied to steel panels and tested for drying time and hardness. The results of the test are set forth in Table I below.

xylene-formaldehyde ratios outside the composition ranges specified.

Comparison of runs 7-10 with runs 11-14 again demonstrates the criticality of maintaining a proper phenol to xylene-formaldehyde ratio during resin formation. In the case of runs 7-10, the amounts of phenol used with the resins containing relatively high levels of oxygen was insufficient to form acceptable varnish-grade resins. As runs 11-14 illustrate, when the ratio of moles of phenol to 100 grams of xylene-formaldehyde resin was maintained at about 0.66, varnishes produced from the resin dried much more quickly than varnishes produced from resins that were formed with phenol to xylene-formaldehyde resin ratios below the critical level.

Comparing runs 1-3 with runs 15-17 illustrates the criticality of forming the instant varnish resins from high molecular weight xylene-formaldehyde resins. Resin types A and C have approximately the same amount of oxygen content but have markedly different molecular weights. As shown in the table, each of the resins were reacted with equivalent amounts of phenol. The varnish systems containing each of the resins have, however, significantly different properties. For example, the time to achieve surface dryness with the varnish containing the high molecular weight xylene-formaldehyde resin is approximately 2 times faster than that obtained with the varnish containing the low molecular weight resin. Similarly, the time to achieve a hard dry surface with the varnish containing the low molecular weight xylene-formaldehyde resin is approximately 2 to 3 times longer than the hard dry times secured with varnishes containing the high molecular weight resin.

EXAMPLE 2

Three hundred grams of a high molecular weight xylene-formaldehyde resin containing 8.7 wt. percent oxygen and exhibiting an SSU viscosity at 210° F. of 3550 and 420 grams of a mixture of ortho and para substituted

TABLE I

| Run | Resin Type [1] | Wt. Percent Oxygen in Resin | Moles Phenol, 100 g. Resin | Varnish Cook Time (hrs.) | Drier System [2] | Drying Time, Hours | | | | Film Thickness, mils | Pencil Hardness [3] |
|---|---|---|---|---|---|---|---|---|---|---|---|
| | | | | | | Set to Touch | Surface Dry | Hard Dry | Tack Free | | |
| 1 | A | 9.1 | .46 | 3.4 | 1 | ½ | ½ | 3-4 | 24 | 1.0 | 2B-B |
| 2 | A | 9.1 | .46 | 3.4 | 3 | ½ | ¾ | 1.5 | 24 | 0.9 | 3B-2B |
| 3 | A | 9.1 | .46 | 3.4 | 4 | ½ | ½ | 2-3 | 24 | 1.0 | F-H |
| 4 | A | 9.1 | .80 | 5.2 | 1 | ½ | 1 | 13-14 | 24 | 1.0 | 3B-2B |
| 5 | A | 9.1 | .80 | 5.2 | 3 | ½ | 1 | 7-8 | 24 | 0.8 | F-H |
| 6 | A | 9.1 | .80 | 5.2 | 4 | ½ | 1 | 11-12 | 24 | 1.0 | F-H |
| 7 | B | 13.8 | .46 | 3.5 | 1 | ½ | ½ | 19 | 24 | 0.7 | 3B-2B |
| 8 | B | 13.8 | .46 | 3.6 | 2 | ½ | ½ | 36-37 | 24 | 0.7 | F-H |
| 9 | B | 13.8 | .46 | 3.6 | 3 | ½ | ½ | 22 | 24 | 0.7 | F-H |
| 10 | B | 13.8 | .46 | 3.5 | 4 | ½ | ½ | 21 | 24 | 0.7 | F-H |
| 11 | B | 13.8 | .66 | 5.2 | 1 | ½ | ½ | 14 | 24 | 0.8 | 3B-2B |
| 12 | B | 13.8 | .66 | 5.2 | 2 | ½ | ½ | 14-15 | 24 | 0.8 | F-H |
| 13 | B | 13.8 | .66 | 5.2 | 3 | ½ | ½ | 3-4 | 24 | 0.8 | F-H |
| 14 | B | 13.8 | .66 | 5.2 | 4 | ½ | ½ | 13-14 | 24 | 1.0 | F-H |
| 15 | C | 9.8 | .46 | 6.6 | 1 | ½ | ½ | 7-8 | 24 | 0.8 | 3B-2B |
| 16 | C | 9.8 | .46 | 6.6 | 3 | ½ | 1 | 4 | 24 | 0.8 | 3B-2B |
| 17 | C | 9.8 | .46 | 6.6 | 4 | ½ | 1 | 8 | 24 | 0.8 | F-H |

[1] Resin Type—Type A: Xylene-formaldehyde resin having a molecular weight of 935. Type B: Xylene-formaldehyde resin having a molecular weight of 700. Type C: Xylene-formaldehyde resin having a molecular weight of 528 and a SSU viscosity at 210° F. of 246.
[2] Drier System—1. 0.5% lead, 0.05% manganese, 0.05% cobalt. 2. 0.5 wt. percent lead, 0.16 wt. percent manganese. 3. 0.5 wt. percent lead, 0.08 wt. percent cobalt. 4. 0.5 wt. percent lead, 0.16 wt. percent manganese, 0.08 wt. percent cobalt.
[3] Pencil Hardness—The pencil hardness test is an indication of the toughness of the varnish film and is a measurement of the softest pencil that cuts the film. For example, a 6B pencil is the softest and a 7H pencil is the hardest. Scale=6B . . . . B, HB, F, H . . . . 7H.

The above data demonstrate the criticality of maintaining a proper ratio of phenol to xylene-formaldehyde during the formation of the phenol-modified xylene-formaldehyde varnish resins of this invention. Additionally, the data show the criticality of utilizing a high molecular weight xylene-formaldehyde resin as the starting material if acceptable varnish compositions are to be obtained with the use of the resin. Comparing the data presented in runs 1-3 with the data of runs 4-6 illustrates that varnishes, containing resins formed with a ratio of phenol to xylene-formaldehyde within the ranges heretofore delineated, exhibit surface dry times approximately 2 times faster and hard dry times roughly from 3 to 6 times faster than varnishes containing resins formed with phenol to crotyl phenol and 3-(p-hydroxyphenyl) butene-1 and 3-(o-hydroxyphenyl) butene-1 formed by reacting under acidic conditions phenol with butadiene was reacted under the influence of 1.5 cc. of a 20% methanolic solution of p-toluene sulfonic acid. After an initial induction period of 10 minutes wherein the reactor and its contents were maintained at a temperature of 105° C., the reaction temperature was raised to 125° C. and maintained at this level for 30 minutes. During this time, water was collected from the reactor. This reaction temperature was raised to 150° C. and held for 2 hours. The reaction mixture was then poured from the reactor, cooled and crushed. The molecular weight of the resin product was 1816 as determined by vapor pressure osmometry, and the resin exhibited a melting point of about 100–112° C.

A portion of the resin was then mixed with a drying oil mixture consisting of equal parts of prebodied linseed oil (viscosity Z–7) and tung oil in amounts sufficient to form a 30-gallon oil length cold mix varnish and a drier system made up of 0.5 wt. percent lead, 0.16 wt. percent manganese, and 0.08 wt. percent cobalt naphthenates based on drying oils. The varnish exhibited tack free times of less than 4 hours, hard dry times of from 2–3 hours, and a pencil hardness of 2B–B.

EXAMPLE 3

Two hundred grams of a high molecular weight xylene-formaldehyde resin containing 8.7 wt. percent oxygen and exhibiting an SSU viscosity of 210° F. of 3550 and a mixture of 70 grams of p-tert-butyl phenol and 70 grams of 3-(p-hydroxyphenyl) cyclopentene-1 formed by reacting under acidic conditions phenol with cyclopentadiene was reacted under the influence of 1.0 cc. of a 20% methanolic solution of p-toluene sulfonic acid. The reaction was conducted according to the procedure of Example 2. The product recovered exhibited a molecular weight of 1500 as determined by vapor pressure osmometry and a melting point of about 110° C.

Again, following the procedure of Example 2, a 30-gallon oil length cold mix varnish was formed with the above resin. The varnish so formed was subsequently tested using standard techniques and exhibited tack free times of less than 4 hours, hard dry times varying from 2–3 hours, and a pencil hardness of 3B–2B.

While there are above described a number of specific embodiments of the present invention, it is obviously possible to produce other embodiments of various equivalent modifications and variations thereof without departing from the spirit and scope of the invention.

Having now set forth the general nature and specific embodiments of the present invention, the true scope is now particularly pointed out in the appended claims.

What is claimed is:

1. A method for forming resinous compositions comprising reacting a xylene-formaldehyde resin having a molecular weight as determined by vapor phase osmometry between about 500 to 1000 and an oxygen content varying from about 7 to 16 wt. percent, said oxygen present in said resin in the form of acetal groups, ether groups, hydroxymethyl groups, and methyl ethers of hydroxy methyl groups, with a hydrocarbon substituted phenol compound in the presence of an acid catalyst, the molar quantity of said phenol compound to 100 grams of said xylene-formaldehyde resin varying from about 0.4 to 0.53 for resins containing 7 to about 11 wt. percent oxygen, from 0.53 to 0.66 for resins containing 11 to about 13 wt. percent oxygen, and from 0.66 to 0.80 for resins containing from 13 to 16 wt. percent oxygen.

2. The method of claim 1 wherein said xylene-formaldehyde resin has a molecular weight of about 600 to 900.

3. The method of claim 2 wherein said xylene-formaldehyde resin exhibits an oxygen content of from 8 to 11 wt. percent.

4. The method of claim 1 wherein said hydrocarbon substituted phenol compound is selected from the group consisting of ortho or para aliphatic substituted phenols, said aliphatic substitution having from 3 to 10 carbon atoms.

5. The method of claim 3 wherein said phenol compound is p-tert-butyl phenol.

6. The method of claim 3 wherein said phenol compound is 3-(p-hydroxyphenyl) cyclopentene-1.

7. The method of claim 3 wherein said acid catalyst is p-toluene sulfonic acid.

8. The method of claim 3 wherein said phenol compound is a mixture of ortho and para substituted crotyl phenol and 3-(p-hydroxyphenyl) butene-1 and 3-(o-hydroxyphenyl) butene-1.

9. The product prepared by the method of claim 1.
10. The product prepared by the method of claim 3.
11. The product prepared by the method of claim 4.
12. The product prepared by the method of claim 5.
13. The product prepared by the method of claim 6.
14. The product prepared by the method of claim 8.

15. A varnish composition comprising a mixture of a fatty acid oil and a resinous composition formed by the acid catalyzed reaction of a xylene-formaldehyde resin having a molecular weight as determined by vapor pressure osmometry between about 500 to 1000 and an oxygen content varying from about 7 to 16 wt. percent, said oxygen present in said resin in the form of acetal groups, ether groups, hydroxymethyl groups, and methyl ethers of hydroxy methyl groups, with a hydrocarbon substituted phenol compound, the molar quantity of said phenol compound to 100 grams of said xylene-formaldehyde resin varying from about 0.4 to 0.53 for xylene-formaldehyde resins containing from 7 to about 11 wt. percent oxygen, from 0.53 to 0.66 for resins containing from 11 to about 13 wt. percent oxygen and from 0.66 to 0.80 for resins containing from 13 to 16 wt. percent oxygen.

16. The composition of claim 15 wherein said xylene-formaldehyde resin has a molecular weight of about 600 to 900 and an oxygen content of from 8 to 11 wt. percent.

17. The composition of claim 16 wherein said phenol compound is selected from the group consisting of ortho or para aliphatic substituted phenols, said aliphatic substitution having from 3 to 10 carbon atoms.

18. The composition of claim 16 wherein said phenol compound is p-tert-butyl phenol.

19. The composition of claim 16 wherein said phenol compound is 3-(p-hydroxyphenyl) cyclopentene-1.

20. The composition of claim 16 wherein said phenol compound is a mixture of ortho and para substituted crotyl phenol and 3-(p-hydroxyphenyl) butene-1 and 3-(o-hydroxyphenyl) butene-1.

21. The composition of claim 17 wherein said fatty acid oil is a mixture of linseed and tung oils.

References Cited

UNITED STATES PATENTS

| | | | |
|---|---|---|---|
| 2,954,360 | 9/1960 | Krzikalla et al. | 260—57 |
| 2,987,498 | 6/1961 | de Jong | 260—67 |
| 3,053,793 | 9/1962 | Imoto et al. | 260—838 |
| 3,303,167 | 2/1967 | Kakiuchi et al. | 260—57 |
| 3,347,952 | 10/1967 | Tanaka et al. | 260—838 |

MURRAY TILLMAN, *Primary Examiner.*

J. C. BLEUTGE, *Assistant Examiner.*